United States Patent
Cuan et al.

(10) Patent No.: US 11,886,567 B2
(45) Date of Patent: *Jan. 30, 2024

(54) COMPUTER-BASED SYSTEMS WITH PROGRAMMED AUTOMATIC REAL-TIME UPDATABLE BROWSING DATA OBJECTS AND ACTIVITY DATA OBJECTS AND METHODS OF USE THEREOF

(71) Applicant: Capital One Services, LLC, McLean, VA (US)

(72) Inventors: Lukiih Cuan, Washington, DC (US); Xiaoguang Zhu, McLean, VA (US); Jason Ji, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,838

(22) Filed: May 19, 2022

(65) Prior Publication Data

US 2022/0277067 A1 Sep. 1, 2022

Related U.S. Application Data

(63) Continuation of application No. 16/902,538, filed on Jun. 16, 2020, now Pat. No. 11,341,229, which is a (Continued)

(51) Int. Cl.
*G06F 21/40* (2013.01)
*G06Q 30/0241* (2023.01)
(Continued)

(52) U.S. Cl.
CPC ............ *G06F 21/40* (2013.01); *G06F 21/316* (2013.01); *G06Q 30/0277* (2013.01); *H04L 63/00* (2013.01)

(58) Field of Classification Search
CPC ... G06F 21/316; G06F 21/40; G06Q 30/0277; H04L 63/00; H04L 63/08; H04L 67/535
See application file for complete search history.

(56) References Cited

U.S. PATENT DOCUMENTS

| 10,187,394 B2 | 1/2019 | Bar et al. |
| 10,411,978 B1 | 9/2019 | Ball et al. |

(Continued)

OTHER PUBLICATIONS

Tippets, "Introducing Cloud Interaction Studio—Instantly Deliver Contextually Relevant Marketing Experiences", Jun. 13, 2018; Salesforce Marketing Cloud, p. 1-4.

*Primary Examiner* — Christopher A Revak
(74) *Attorney, Agent, or Firm* — Greenberg Traurig, LLP

(57) ABSTRACT

In order to provide improved matching of records between different sources, systems and methods include generating a data link between a stored interaction profile of the user and activity data records that identify activities performed by the user. Online interaction data associated with the user is received, including tracking data indicative of online interactions with content. The online interaction data is stored in the stored interaction profile associated with the user. An activity model is used to predict correlation parameters representing groupings of online interactions of the online interaction data with activities performed by the user, where the prediction is based on the tracking data and each activity in the interaction profile. The interaction profile is updated with the groupings and user activities are authenticated based on the interaction profile.

20 Claims, 8 Drawing Sheets

Related U.S. Application Data continuation of application No. 16/773,587, filed on Jan. 27, 2020, now Pat. No. 10,762,190.

(51) Int. Cl.
*H04L 9/40* (2022.01)
*G06F 21/31* (2013.01)

(56) References Cited

U.S. PATENT DOCUMENTS

| | | |
|---|---|---|
| 10,762,190 B1 | 9/2020 | Cuan et al. |
| 11,341,229 B2 * | 5/2022 | Cuan ................. H04L 63/00 |
| 11,580,585 B1 * | 2/2023 | Rajana ............. G06Q 30/0627 |
| 2005/0273430 A1 | 12/2005 | Pliha |
| 2011/0196795 A1 | 8/2011 | Pointer |
| 2013/0073473 A1 | 3/2013 | Heath |
| 2016/0086185 A1 | 3/2016 | Adjaoute |
| 2016/0337399 A1 | 11/2016 | Kamath et al. |
| 2017/0289168 A1 | 10/2017 | Bar et al. |
| 2018/0288034 A1 | 10/2018 | Edwards et al. |
| 2020/0342351 A1 | 10/2020 | Liu et al. |
| 2022/0269954 A1 * | 8/2022 | Harris ................. G06N 5/022 |
| 2022/0345543 A1 * | 10/2022 | Oleinikov ............ G06F 16/28 |

\* cited by examiner

US 11,886,567 B2

COMPUTER-BASED SYSTEMS WITH PROGRAMMED AUTOMATIC REAL-TIME UPDATABLE BROWSING DATA OBJECTS AND ACTIVITY DATA OBJECTS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for one or more novel technological solutions of systems and methods for automatic real-time updatable browsing data objects and activity data objects.

BACKGROUND OF TECHNOLOGY

A computer network system may include a group of computers (e.g., clients, servers, smart routers) and other computing hardware devices that are linked together through one or more communication channels to facilitate communication and resource-sharing, via one or more specifically programmed graphical user interfaces (GUIs), among a wide range of users.

Certain online behaviors, such as clicks and selections, within a GUI of some tools may be tracked by those tools. However, behaviors beyond the GUI of those tools are unknown to the tools. Thus, any correlation to activities beyond such a GUI is also unknown.

SUMMARY OF DESCRIBED SUBJECT MATTER

In some embodiments, the present disclosure provides an exemplary technically improved computer-based method that includes at least the following steps of receiving, by at least one processor, an authentication request in response to a user selection at a user computing device associated with a user. Generating, by the at least one processor, at least one data link between: i) a stored interaction profile of the user and ii) at least one activity data record that identifies at least one entity-related activity performed by the user, where the stored interaction profile is stored in at least one profile database, and where the at least one activity data record includes: i) an activity type indicator that indicates a type of each respective entity-related activity of the at least one entity-related activity, ii) a related entity indicator that indicates at least one entity associated with each respective entity-related activity of the at least one entity-related activity, and iii) a date indicator that indicates a date associated with each respective entity-related activity of the at least one entity-related activity. Receiving, by the at least one processor, at least one online interaction data object associated with the user, where each respective online interaction data object of the at least one online interaction data object includes tracking data indicative of a respective at least one online interaction with content associated with a respective third-party merchant, and where the tracking data associated with each respective at least one online interaction includes: i) a third-party merchant indicator indicating the respective third-party merchant, ii) a product indicator indicating a product associated with the content, and iii) an interaction date indicator indicating a date of each online interaction. Storing, by the at least one processor, the at least one online interaction data object in the stored interaction profile associated with the user. Utilizing, by the at least one processor, an activity model to predict at least one correlation parameter representing a respective grouping of online interactions of the at least one online interaction data object that are correlated with a respective one or more activities of the activity data record using the at least one data link, where the prediction of the correlation parameter is based at least in part on the tracking data of each respective online interaction data object of the at least one online interaction data object associated with the user and each record of account activities in the at least one activity data record associated with the user. Updating the stored interaction profile associated with the user based on each respective grouping of the respective online interactions of the at least one online interaction data object and the respective one or more activities of the activity data record using the at least one data link. Causing to display, by the at least one processor, an authentication of the user selection in response to the authentication request based on the respective grouping of online interactions.

In some embodiments, the present disclosure provides an exemplary technically improved computer-based method that includes at least the following steps of receiving, by at least one processor, an online interaction by a user with content associated with a third-party merchant, where the online interaction includes tracking data, and where the tracking data includes: i) a third-party merchant indicator indicating the third-party merchant associated, ii) a product indicator indicating a product associated with the content, and iii) an interaction date indicator indicating a date of each online interaction. Storing, by the at least one processor, the online interaction in an online interaction data object associated with the user. Utilizing, by the at least one processor, an account activity model to predict a correlation parameter representing a grouping of the online interaction with one or more entity-related activities of at least one activity data record associated with the user based at least in part on the tracking data and each entity-related activity in the at least one activity data record, where each entity-related activity includes: i) an activity type indicator that indicates a type of each respective entity-related activity of the one or more entity-related activities, ii) a related entity indicator that indicates at least one entity associated with each respective entity-related activity of the one or more entity-related activities, and iii) a date indicator that indicates a date associated with each respective entity-related activity of the one or more entity-related activities. Updating the stored interaction profile associated with the user based on each respective grouping of the respective online interactions of the at least one online interaction data object and the respective one or more activities of the activity data record using the at least one data link. Causing to display, by the at least one processor, an authentication of a user selection based on the correlation parameter representing the grouping of the online interaction with the one or more entity-related activities.

In some embodiments, the present disclosure provides an illustrative computer-based system that includes at least the following components of at least one activity database configured to store an at least one activity data record associated with a user, at least one profile database configured to store a stored interaction profile associated with the user, and at least one processor in communication with the account database and the online interaction database. The at least one processor is configured to: receive an authentication request in response to a user selection at a user computing device associated with a user; generate at least one data link between: i) a stored interaction profile of the user and ii) at least one activity data record that identifies at least one entity-related activity performed by the user; where the stored interaction profile is stored in the at least one profile database; where the at least one activity data record includes: i) an activity type indicator that indicates a type of each respective entity-related activity of the at least one entity-related activity, ii) a related entity indicator that indicates at least one entity associated with each respective entity-related activity of the at least one entity-related activity, and iii) a date indicator that indicates a date associated with each respective entity-related activity of the at least one entity-related activity; receive at least one online interaction data object associated with the user; where each respective online interaction data object of the at least one online interaction data object includes tracking data indicative of a respective at least one online interaction with content associated with a respective third-party merchant; where the tracking data associated with each respective at least one online interaction includes: i) a third-party merchant indicator indicating the respective third-party merchant, ii) a product indicator indicating a product associated with the content, and iii) an interaction date indicator indicating a date of each online interaction; store the at least one online interaction data object in the stored interaction profile associated with the user; utilize an activity model to predict at least one correlation parameter representing a respective grouping of online interactions of the at least one online interaction data object that are correlated with a respective one or more activities of the data record using the at least one data link; where the prediction of the correlation parameter is based at least in part on the tracking data of each respective online interaction data object of the at least one online interaction data object associated with the user and each record of account activities in the at least one activity data record associated with the user; update the stored interaction profile associated with the user based on each respective grouping of the respective online interactions of the at least one online interaction data object and the respective one or more activities of the activity data record using the at least one data link; and cause to display an authentication of the user selection in response to the authentication request based on the respective grouping of online interactions.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments of.

DETAILED DESCRIPTION

Figure 1:
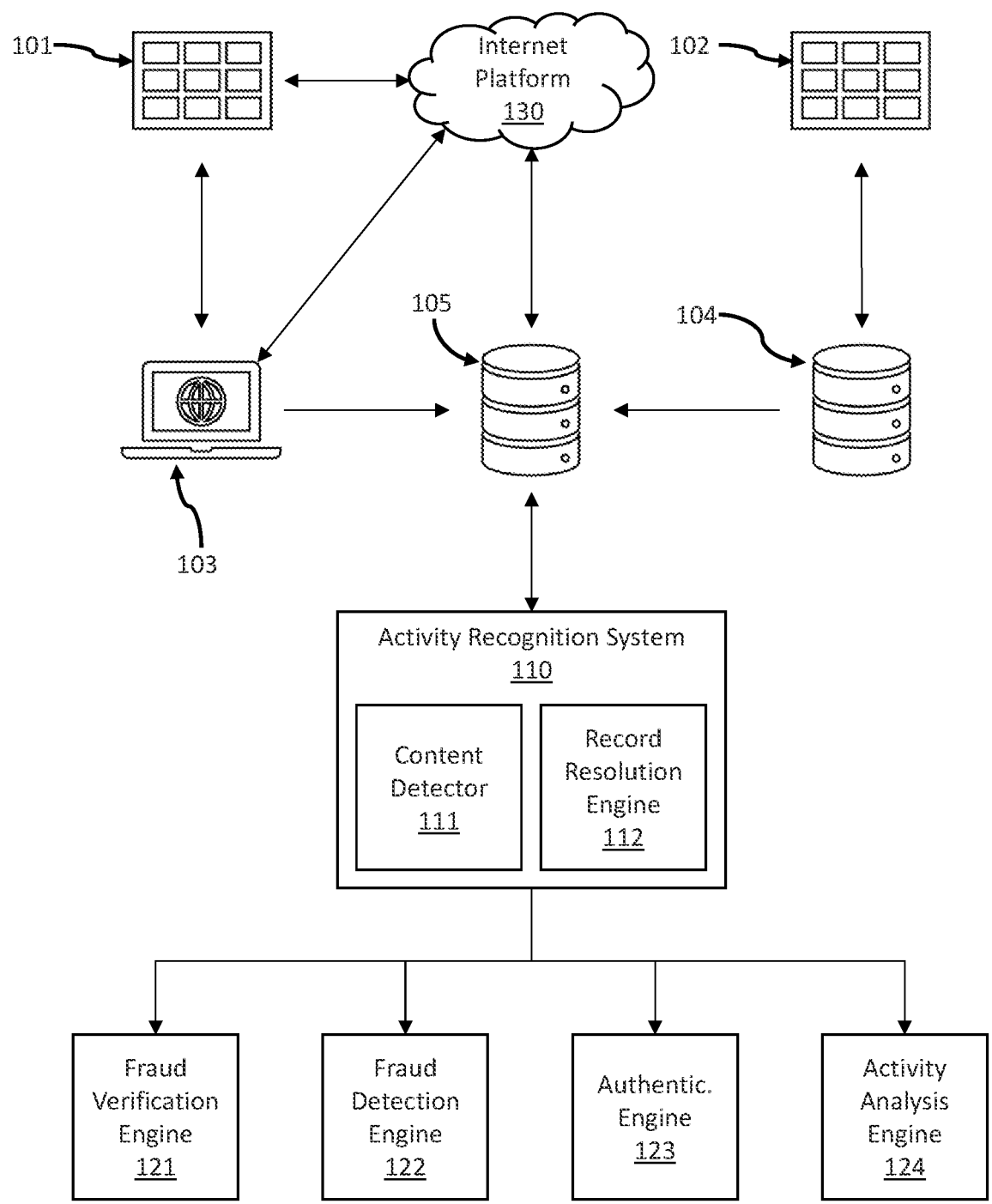
FIGS. 1-8 show one or more schematic flow diagrams and certain computer-based architectures which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect or functionality of various embodiments described herein can be performed in real-time and dynamically. As used herein, the term "real-time" is directed to an event or action that can occur instantaneously or almost instantaneously in time when another event or action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and linguistic relatives or derivatives, mean that certain events and actions can be triggered or occur without any human intervention. In some embodiments, events and actions in accordance with the present disclosure can be in real-time or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, specially programmed computing systems with associated devices are configured to operate in the distributed network environment, communicating with one another over one or more suitable data communication networks (e.g., the Internet, satellite, etc.) and utilizing one or more suitable data communication protocols or modes such as, without limitation, IPX/SPX, X.25, AX.25, Apple-Talk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component or a combination of at least one software component and at least one hardware component which are designed, programmed, or configured to manage or control other software and hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements or software elements or both may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and computing software languages (e.g., C++, Objective-C, Swift, Java, JavaScript, Python, Perl, QT, etc.).

In some embodiments, one or more illustrative embodiments of computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone, PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more illustrative embodiments of computer-based systems of the present disclosure may obtain, manipulate, transfer, store, transform, generate, or output any digital object or data unit (e.g., from inside or outside of a particular application) that can be in any suitable form such as, without limitation, a file, a contact, a task, an email, a tweet, a map, an entire application (e.g., a calculator), etc. In some embodiments, as detailed herein, one or more illustrative embodiments of computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, illustrative embodiments of computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative embodiments of computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative embodiments of computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects or combinations thereof. For example, such projections may be a visual overlay for a mobile augmented reality (MAR) application.

In some embodiments, illustrative embodiments of computer-based systems of the present disclosure may be configured to be utilized in various applications which may include, but not limited to, gaming, mobile-device games, video chats, video conferences, live video streaming, video streaming and augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing system of the present disclosure or any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless or non-wireless communication or combination thereof; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative embodiments of computer-based systems of the present disclosure may be configured to securely store and transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of determining a correlation between web-based activity data representing web-based behaviors with external activity data objects representing external activities for automatic real-time updates to browsing data objects. The following embodiments provide technical solutions and technical improvements that overcome technical problems, drawbacks or deficiencies in the technical fields involving record resolution and correlation, record discovery, and database interoperability. As explained in more detail, below, technical solutions and technical improvements herein include aspects of improved activity detection and recognition, and improved database interoperability to correlate web-based activities with non-web-based activities. Based on such technical features, further technical benefits become available to users and operators of these systems and methods. Moreover, various practical applications of the disclosed technology are also described, which provide further practical benefits to users and operators that are also new and useful improvements in the art.

Herein, "web-based" refers to actions, activities, behaviors, content, and data related to one or more platform existing on the world-wide-web or the Internet. Meanwhile, "external" refers to actions, activities, behaviors, content, and data related to one or more platforms different from the aforementioned web-based platforms.

FIG. 1 is a block diagram of an illustrative computer-based system for social media data grouping in accordance with one or more embodiments of the present disclosure.

In some embodiments, a profile database 105 is in communication with a user computing device 103 and a user account database 104 for grouping of user activities, e.g., on the Internet, such as on a social network, and user data 102, such as, e.g., user transaction data including financial transaction history data stored in the account database 104. In some embodiments, the profile database 105 may compare characteristics of activity data objects of the user data 102 with online behavior data 101 received from the user computing device 103 to match online behaviors and activities that are potentially related to transactions or other external or offline activities involving the user.

In some embodiments, the user computing device 103 is in communication with an Internet platform 130 such as, e.g., a web browser, application or other Internet platform 130 such that a user may browse websites, blogs, social networks, and other web-based content. In some embodiments, the profile database 105, via the user computing device 103 may recognize the content appearing on a screen of the user computing device 103 using, e.g., an activity recognition system 110.

For example, in some embodiments, a web browser on the user computing device 103 may include a browser extension that detects content and transmits an online behavior data 101 associated with the user interaction with the content to a content detector 111 of the activity recognition system 110. In another example, the user interactions with, e.g., web-based content may be within an application stored on the user computing device 103, such as, e.g., a social media application, a web-browser, or other application having content detection functionality such that the application may transmit the indications of user interaction. In another example, content detection is embedded in or provided by, e.g., social media analytics, on the internet platform 130 using, e.g., a suitable software development kit (SDK) for engaging with the social media service or other internet platform 130.

In some embodiments, the content detector 111 itself is located on the user computing device 103, for example, in a memory of the user computing device 103. For example, a browser extension, such as the browser extension described above, may include the content detector 111 to detect and record user interaction with content to create the online behavior data 101. The content detector 111 at the user computing device 103 may then transmit the online behavior data 101 to the profile database 105. Alternatively, or in addition, the content detector 111 may be located on the internet platform 130, e.g., as part of a social media SDK to cause the internet platform 130 to collect and transmit the online behavior data 101 to the profile database 105.

In some embodiments, the content detector 111 may include, e.g., image recognition utilizing, e.g., machine learning classifiers, such as a neural network (e.g., convolutional neural network (CNN), recurrent neural network (RNN), artificial neural network (ANN) or other neural network), a support vector machine, k-Nearest Neighbor, an autoencoder, decision trees, or other machine learning classifier to classify images of the web-based content. The content detector 111 may also include, e.g., text recognition or natural language processing by utilizing, e.g., machine learning classifiers, such as those described above for text recognition and parsing to understand text of the web-based content.

In some embodiments, the content detector 111 includes a text parsing algorithm to identify matches to a dictionary of particular words, phrases or both, such as, e.g., brand names, company names, organization names, products, persons, or other words or phrases. In some embodiments, the content detector 111 may include a tag recognition algorithm to identify, e.g., tags such as hypertext markup language (HTML) tags. Thus, in some embodiments, where the content includes, e.g., an advertisement, the content may include tags identifying advertisement details such as an associated merchant, a product, a service, among other advertisement details. Using, e.g., text parsing or tag recognition or a combination thereof, the content detector 111 may recognize the advertisement details to identify, e.g., sales, products, merchants, among other information.

In some embodiments, the content detector 111 may directly identify content without the use of tags or text parsing. For example, the content detector 111 may be a software development kit (SDK) function, such as, e.g., an embedded SDK or embedded mobile SDK that is embedded into an application, webpage, service, platform, or other content management or delivery system. The embedded SDK may include functionality that automatically receives data regarding, e.g., advertisements, or other content, such as content related to, e.g., brand names, company names, organization names, products, persons, or other content and third-parties. For example, a social media platform or network may embed the SDK associated with the content detector 111 such that any user interaction with content of interest is automatically provided to the content detector 111.

In some embodiments, content of interest that the content detector 111 is configured to detect may include, e.g., advertisements, branded content, sponsored content, influencer generated content, content associated with a selected subject (e.g., news content, political news content, business news content, local news content, media news content, events, meetings, contact information, or other similar content, among others and combinations thereof) or other content of interest and combinations thereof. In some embodiments, the content of interest may be selectable or configurable by a user or administrator. In some embodiments, the content detector 111 is configured to detect and return data regarding the content of interest as it appears in, e.g., a website, a blog post, a social media feed, a real-simple-syndication (RSS) feed, search engine results, video or audio content, among other mediums and combinations thereof. Accordingly, in some embodiments, the content detector 111 may receive, e.g., in real-time, a user's interaction with content of interest using, e.g., real-time text, tag parsing or a combination thereof, embedded SDK functionality, or other techniques. In some embodiments, where the content detector 111 employs text, tag parsing or a combination thereof, the content detector 111 may continually detect user interactions with content and process the content being interacted with to identify content of interest. However, where the content detector 111 is employed in an embedded SDK, the content detector 111 may rely on host service to receive an indication that the user has interacted with the content of interest.

In some embodiments, the content detector 111 may detect, automatically and in real-time, that the content with which the user is or was interacting is associated with one or more of a set of particular entities or products and services using, e.g., the machine learning classifiers, text parsing or a combination thereof as described above. For example, the content detector 111 may detect, e.g., an online behavior data 101 from the user interaction with the content, including, e.g., an activity type indicator that indicates a type of user interaction, an entity-related indicator that indicates an entity associated with the content, and a data indicator that indicates a date of the interaction. Upon receiving or producing the online behavior data 101, the content detector 111 may determine whether the content includes content associated with an entity, product or service of the set of particular entities, products and services. Where the content is associated with one or more of the entities, products, services or combinations thereof in the set, the content detector 111 may trigger the activity recognition system 110 to group the interaction with one or more activity data objects of the user data 102 in the account database 104.

In some embodiments, the account database 104 may provide the user data 102 including the activity data objects associated with a user to the profile database 105 to generate a user interaction profile recording activity data objects linked with online behavior data 101 using, e.g., an entity identifier 113, an activity identifier 114 and a record resolution engine 112.

In some embodiments, as described above, the content detector 111 detects, e.g., an entity associated with a content with which a user has interacted on the user computing device 103. In some embodiments, the content detector 111 may detect a product or service associated with the content, and then an entity associated with the product or service. The content detector 111 may provide the entity associated with the content, such as, e.g., a third-party merchant, as well as, e.g., the product or service and a date and time at which the interaction was recorded. Similarly, in some embodiments, the activity data of the user data 102 may include, e.g., an associated date indicator, an associated entity indicator and an associated activity indicator for each activity data objected. For example, in some embodiments, the activity data object includes a record of transactions, with, e.g., indicators of the entity with whom the user transacted, the type of transaction, and the date or time or both at which the transaction took place. However, other activity data objects are also contemplated, such as, e.g., location or navigation activities, or other non-web-based activities.

In some embodiments, the record resolution engine 112 receives the interaction data object and the activity data object and groups, automatically and in real-time, user interactions in the interaction data object with activities in the activity data object that are related to each other. In some embodiments, the record resolution may compare data from each of the activities of the activity data objects and from each of the interactions of the interaction data object. For example, in some embodiments, the record resolution engine 112 may utilize a machine learning model that receives the associated date, entity, product data or combinations thereof from each of the activity data object and the interaction data object to determine a correlation between user web-based interactions and user activities, e.g., transactions to predict activities influenced by the web-based interactions. In some embodiments, the record resolution engine 112 utilizes a set of rules, including, e.g., thresholds such as date thresholds for differences between an activity and a web-based interaction. In some embodiments, a combination of rules and a machine learning model may be used.

In some embodiments, the grouped activity data objects and interaction data objects may be saved as online interaction groupings with associated user activities in the profile database 105. In some embodiments, the online interaction groupings may be utilized for security and behavior analysis, among other applications.

For example, in some embodiments, the online interaction groupings may be provided to a fraud verification engine 121. In some embodiments, a user may input a fraud report, e.g., via the user computing device 103 or by some other mechanisms, such as another device, over the telephone, in person, or other method. In some embodiments, the fraud report may include data representing an incorrectly recorded user activity in the user activity data objects 102. For example, the user activity data objects 102 may include records of financial transaction data, such as, e.g., credit card charges, bank account balance transfers, withdrawals, deposits, or other financial transactions and combinations thereof. The user may then dispute a transaction recorded in the activity data objects 102 as fraudulent or otherwise incorrect, either in amount or as having occurred at all.

In some embodiments, the fraud verification engine 121 may receive the dispute from the user and the online interaction groupings from the activity recognition system 110 and the profile database 105. Where the disputed activity data object is grouped with one or more online interactions, as represented by the online interaction groupings, the fraud verification engine 121 may return an inquiry to the user including a verification message. In some embodiments, the verification message may cause the user computing device 103 or other device associated with the user to display a prompt with a reminder of the one or more online interactions grouped with the disputed activity data object to remind the user of the online interactions, and a request for verification of the dispute. However, where the disputed activity data object has no grouped online interactions, the fraud verification engine 121 may verify the dispute and process the fraud report to, e.g., recommend to an administrator or other personnel to cancel the activity data object from the user's activity data objects 102.

In some instances, the prompt regarding the online interactions may remind the user of an activity, such as a transaction, that was previously unrecognized. In reminding the user of the online interactions, the user may be reminded of the activity such that the user may rescind the dispute in response to the request for verification. However, the user may still not recognize the activity data object upon being reminded of the online interactions, and may confirm the dispute. The fraud verification engine 121 may verify the dispute and process the fraud report to, e.g., recommend to an administrator or other personnel to cancel the activity data object from the user's activity data objects 102.

In some embodiments, the online interaction groupings may be provided to a fraud detection engine 122. In some embodiments, the online interaction groupings may be used to detect fraud or otherwise erroneous activity data objects. For example, the fraud detection engine 122 may, e.g., utilize a fraud detection machine learning model to correlate online interaction groupings with incorrect activity data objects that do not have associated online interactions. For example, where the online interaction groupings include online interactions grouped with, e.g., an activity data object including a purchase of a piece of furniture, the fraud detection engine 122 may mark other activity data objects including the purchase of similar pieces of furniture as fraudulent or incorrect. Thus, the fraud detection machine learning model may be trained to determine similar activity data objects, where one of the similar activity data objects having an online interaction grouping may cause the fraud detection machine learning model to predict an error or fraud in the other similar activity data objects. Such a model may be combined with other fraud detection techniques, such as, e.g., an activity data object falling outside of a threshold deviation from, e.g., a mean or median activity value such as a mean or median purchase amount, exceeding a limit on number of activities or a quantity associated with one or more activities, or other fraud detection technique.

For example, in some embodiments, the fraud detection engine 122 may be employed in transaction fraud analysis that takes into account user interactions with any product-related content. In some embodiments, in addition to fraud analysis for a user transaction, such as, e.g., a purchase of a product, the fraud detection engine 122 may additionally determine an interaction and frequency of interaction with content related to the product being purchased as determined by the activity recognition system 110. Based on the activity data, the fraud detection engine 122 may increase or decrease a likelihood of fraud of the transaction. For example, a risk of fraud may be increased where the product associated with the transaction is not associated with any online behavior data 101 as determined by the activity recognition system 110, or where a date of an interaction with content associated with product is far in the past (e.g., 2 weeks, 3 weeks, 1 month, or more). However, where the online behavior data 101 has been recognized to be associated with interactions with content associated with the product in a recent period (e.g., in the last 2 weeks, in the last week, in the last 4 days, in the last 2 days, in the last day, in the last hour, etc.), or where such interactions are of a high frequency level (e.g., more than once, more than twice, more than three times, etc.) in the recent period, the risk of fraud may be determined to be less in response to the recency of interactions, frequency of interactions, or a combination thereof.

In some embodiments, the online interaction groupings may be provided to an authentication engine 123. In some embodiments, the user may access, e.g., an online account using an authentication technique such as a username and password. In some embodiments, the authentication technique may include, e.g., multi-factor authentication leveraging the online interaction groupings. For example, the authentication engine 123 may generate a message to cause a user device to display an inquiry regarding an activity data objected as a result of an online interaction. For example, the authentication engine 123 may inquire as to what a user purchased upon viewing a particular advertisement or content associated with a product, service or brand, or proceeding through an online purchase checkout at a particular retailer, or other interaction. In some embodiments, the user may then authenticate access to the online account by correctly identifying an activity associated with the activity data object of the appropriate online interaction grouping.

As an example, embodiments of the authentication engine 123 may employ activity recognition by the activity recognition system 110 of user behaviors in social media services. For example, the authentication engine 123 may display a number of recently browsed news, ads, or other content posts, e.g., 3, 4, 5 or more content posts. In some embodiments, the authentication engine 123 may use user behaviors from a recent time period such as, e.g., with the past day, within the past two days, within the past week, or other suitable period that a user may reliably remember. The authentication engine 123 may then display the recently browsed content posts and present, e.g., a series of questions. In some embodiments, the authentication engine 123 may employ a threshold (e.g., 3 out of 3 correct answers) to authenticate based on user responses to the presented questions. Accordingly, the authentication engine 123 provides a real-time behavioral authentication method where correct answers change continuously through time. As a result, it is harder for fraudsters to crack the authentication. In some embodiments, the questions may be predetermined, configurable by an administrator, variable (e.g., a subset from a library of questions may be selected for presentation to a user for authentication), or other technique for providing authentication questions.

In some embodiments, the online interaction groupings may be provided to an activity analysis engine 124. In some embodiments, the activity analysis engine 124 may utilize the transaction groupings to determine a correlation between online interactions and subsequent user activities. For example, the activity analysis engine 124 may evaluate the effectiveness of advertising on, e.g., social media, using the online interactions with the advertising and user activity data objects, e.g., purchases, grouped with the online interactions. In some embodiments, the activity analysis engine 124 may determine a similarity between an advertised product or service by a merchant, and a corresponding user activity data object of a purchase for the product or service. Where the online interaction and the user activity data object occur within, e.g., 1 day, 12 hours, 6 hours, 1 hour, or other suitable time frame, of each other and are associated with a common entity, the activity analysis engine 124 may determine that the content effectively influences the user activity of the activity data object.

Accordingly, by merging user activity data objects 102 with online behavior data 101 with web-based content, the system of some embodiments of the present invention may more effectively draw correlations for the influence of online content with user activities. The correlations may be more efficiently and accurately determined because the systems and methods of embodiments of the present invention may access both user activity data objects 102 and online behavior data 101, and group the two datasets into a profile database 105, forming a unified, comprehensive dataset of user behaviors.

Figure 2:
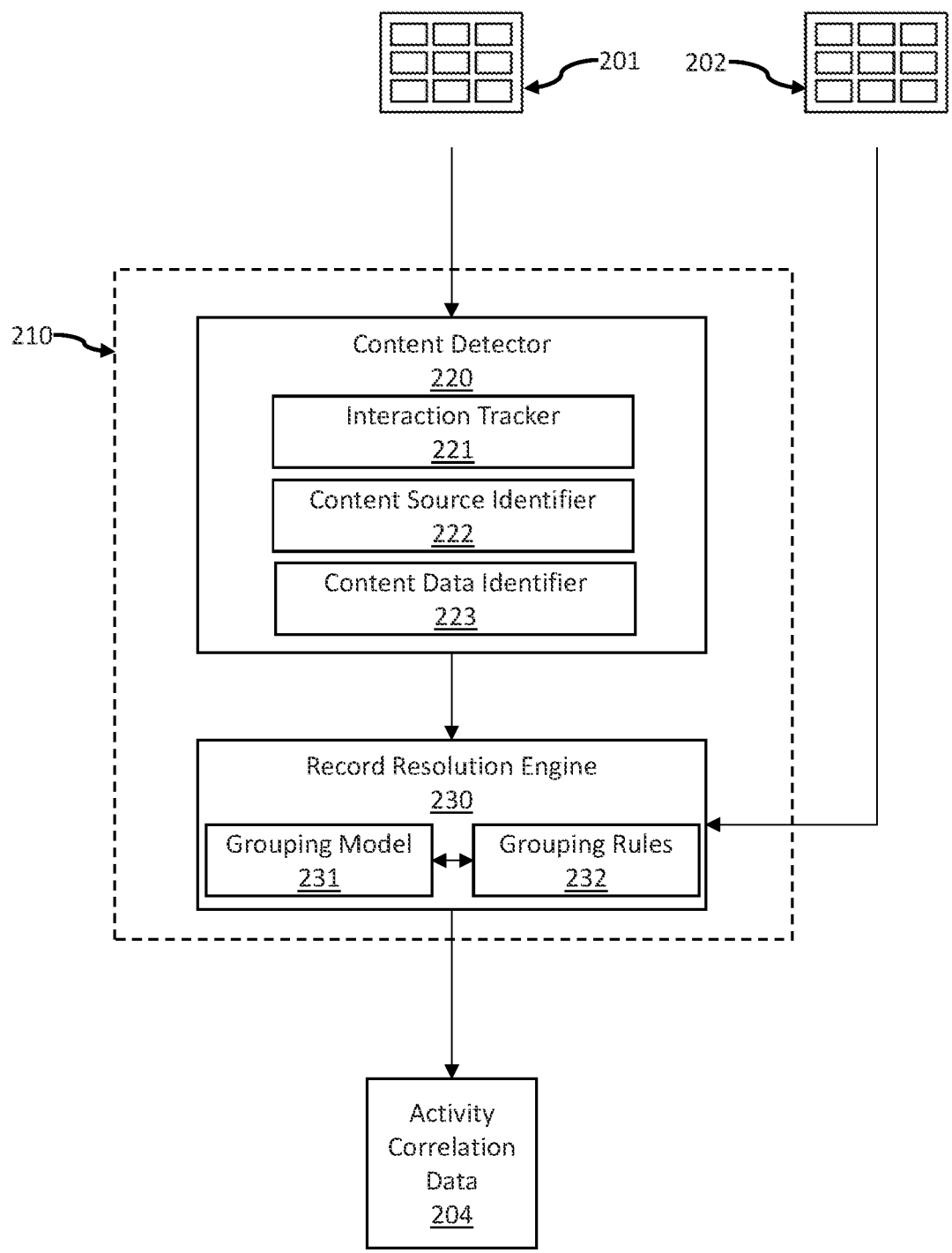

FIG. 2 is a block diagram of another illustrative computer-based system for social media data grouping in accordance with one or more embodiments of the present disclosure.

In some embodiments, an activity recognition system 210, such as the activity recognition system 110 described above, may include a content detector 220 and a record resolution engine 230. In some embodiments, the content detector 220 may receive online behavior data 201. In some embodiments, the content detector 220 may identify user interactions with online content using an interaction tracker 221. Upon the interaction tracker 221 detecting behaviors including interactions with merchant content, such as, e.g., advertisements on a social media page, publication, blog, video, or other web-based content, the interaction tracker 221 may trigger a content source identifier 222 and a content data identifier 223 to identify a source of the web-based content and characteristics of the content (e.g., date of interaction, associated products, among others), respectively.

In some embodiments, the interaction tracker 221 may including, e.g., a logging mechanism for logging user clicks to determine one what portions of a web-page or social media page the user clicks. As a result, the interaction tracker 221 may detect user interactions with content, such as, e.g., by clicking on advertisements or other merchant content, including sponsored posts, sponsored articles and videos, merchant posts, articles and videos, among others and combinations thereof. In some embodiments the interaction tracker 221 includes a persistent storage device such as, e.g., a solid-state drive, hard drive, magnetoresistive drive, server hard drive, cloud storage, or other persistent storage device. In some embodiments the interaction tracker 221 may temporarily log user interactions with web-based content based on, e.g., a timer such that the log entries are deleted periodically, such as, e.g., every 15 minutes, every 30 minutes, every hour, every day, every week, or other period. However, in some embodiments, each log is maintained until the end of a user browsing session, such as, e.g., by the user closing or exiting the browser, application, or other interface for interacting with the content. In some embodiments, the interaction tracker 221 may store the log in a temporary storage device, such as, e.g., a cache, buffer, random access memory (RAM) or other temporary storage device.

In some embodiments, interactions with content that is logged by the interaction tracker 221 may analyzed by the content source identifier 222 to identify a source of the content, such as, e.g., an associated merchant or marketing entity.

In some embodiments, the content source identifier 222 may include, e.g., image recognition utilizing, e.g., machine learning classifiers, such as a neural network (e.g., convolutional neural network (CNN), recurrent neural network (RNN), artificial neural network (ANN) or other neural network), a support vector machine, k-Nearest Neighbor, an autoencoder, decision trees, or other machine learning classifier to classify images of the web-based content. The content source identifier 222 may also include, e.g., text recognition, natural language processing or other suitable technique of content identification and combinations thereof by utilizing, e.g., machine learning classifiers, such as those described above for text recognition and parsing to understand text of the web-based content.

In some embodiments, the content source identifier 222 includes a text parsing algorithm to identify matches to a dictionary of particular words or phrases, such as, e.g., brand names, company names, organization names, products, persons, or other words or phrases. In some embodiments, the content source identifier 222 may include a tag recognition algorithm to identify, e.g., tags such as hypertext markup language (HTML) tags. Thus, in some embodiments, where the content includes, e.g., an advertisement, the content may include tags identifying advertisement details such as an associated merchant, a product, a service, among other advertisement details. Using, e.g., text parsing, tag recognition or other content recognition techniques and combinations thereof, the content source identifier 222 may recognize the advertisement source to identify, e.g., merchants, or other associated entities.

In some embodiments, the content source identifier 222 may include, e.g., a list of known entities, such as, e.g., known merchants. Based on the entity information determined by, e.g., text or image recognition or HTML tag recognition, as described above, the content source identifier 222 may identify whether each interaction in the log is an interaction with content generated by a merchant. In some embodiments, before identifying the source entity, the content source identifier 222 may identify whether the content is branded or sponsored content, such as, e.g., an advertisement, promotion, article, video, post, or other content produced by the entity, such as a merchant. However, in some embodiments, the content source identifier 222 may simply be configured to determine the source and whether that source is a merchant.

In some embodiments, the content detector 222 may directly identify content without the use of tags, text parsing or other technique and combinations thereof. For example, the content detector 222 may be a software development kit (SDK) function, such as, e.g., an embedded SDK or embedded mobile SDK that is embedded into an application, webpage, service, platform, or other content management or delivery system. The embedded SDK may include functionality that automatically receives data regarding, e.g., advertisements, or other content, such as content related to, e.g., brand names, company names, organization names, products, persons, or other content and third-parties. For example, a social media platform or network may embed the SDK associated with the content detector 222 such that any user interaction with content of interest is automatically provided to the content detector 222.

In some embodiments, content of interest that the content detector 222 is configured to detect may include, e.g., advertisements, branded content, sponsored content, influencer generated content, content associated with a selected subject (e.g., news content, political news content, business news content, local news content, media news content, events, meetings, contact information, or other similar content, among others and combinations thereof) or other content of interest and combinations thereof. In some embodiments, the content of interest may be selectable or configurable by a user or administrator. In some embodiments, the content detector 222 is configured to detect and return data regarding the content of interest as it appears in, e.g., a website, a blog post, a social media feed, a real-simple-syndication (RSS) feed, search engine results, video or audio content, among other mediums and combinations thereof. Accordingly, in some embodiments, the content detector 222 may receive, e.g., in real-time, a user's interaction with content of interest using, e.g., real-time text and tag parsing, embedded SDK functionality, or other techniques. In some embodiments, where the content detector 222 employs text and tag parsing, the content detector 222 may continually detect user interactions with content and process the content being interacted with to identify content of interest. However, where the content detector 222 is employed in an embedded SDK, the content detector 222 may rely on host service to receive an indication that the user has interacted with the content of interest.

In some embodiments, upon identifying the source of the content of each interaction, the content source identifier 222 may trigger the content data identifier 223 to identify data related to the content, such as, e.g., a product or service, a date of the interaction, a platform on which the interaction occurred, among other data. Similar to the content source identifier 222, the content data identifier 223 may utilize, e.g., image recognition, text recognition, text parsing, HTML, tag identification, among other recognition techniques and combinations thereof, to extract the data from the content and the interaction log. Accordingly, the content data identifier 223 may generate tracking data associated each interaction, including, e.g., a merchant indicator indicating the respective merchant of the content, a product indicator indicating a product associated with the content, an interaction date indicator indicating a date of each interaction, a platform indicator indicating a platform on which the interaction occurred, among other data.

In some embodiments, upon generating the tracking data, the content detector 220 may trigger the record resolution engine 230 to correlate online interactions of the online behavior data 201 with associated activity data of an activity data object 202. In some embodiments, the record resolution may compare data from each activity data object of the activity data objects 202 and from each of the interactions of the online behavior data 201. In some embodiments, the activity data objects each include an activity data record having an activity type indicator that indicates a type of each activity, a related entity indicator that indicates an entity associated with the activity, and a date indicator that indicates a date on which the activity was performed. For example, the activity may include a financial transaction such as a payment for the purchase of a product or service. As a result, the activity type indicator may indicate the type of transaction (e.g., payment, transfer, deposit, or other transaction), the related entity indicator may indicate a merchant or other entity with whom the user transacted, and the date indicator may indicate the date of the transaction.

In some embodiments, the record resolution engine 230 may group activities and interactions based on the online behavior data 201, including the tracking data produced by the content detector 220, and the activity data records 202. Accordingly, the record resolution engine 230 may link online behavior data 201 with associated activities of the user activity data objects 202 based on a similarity of the interaction date indicator and the activity date indicator, the merchant and product indicators and the related entity indicators, among other data and combinations thereof. In some embodiments, the grouping model 231 includes, e.g., a classification model, such as those described above, with the online behavior data 201 and tracking data, including merchant indicator, a product indicator, and an interaction date indicator, and the activity data records 202 including the activity type indicator, the related entity indicator, and a date indicator that indicates the date indicator, as an input, and predicts a match probability for each combination of the interactions of the online behavior data 201 and the activities of the activity data objects 202.

However, in some embodiments, the grouping model 231 may be augmented by grouping rules 232 for training and filtering. In some embodiments, the grouping model 351 may be assisted by, e.g., filter the online behavior data 201, tracking data and activity data objects 202 according to a date difference. For example, the grouping model 231 may be applied to combinations of interactions and activities that are within a predetermined time-frame of each other, such as, e.g., about e.g., 1 day, 12 hours, 6 hours, 1 hour, or other suitable time frame. Such filtering may assist with training the grouping model 231 by reducing outliers and noise including combinations of interactions and activities that are not correlated based on date. Moreover, the grouping may be made more efficient because the grouping model 351 may operate on fewer combinations, thus reducing processing time and resources. The grouping model 231 may then better learn to determine correlations using the dates as parameters for grouping.

As a result, the grouping model 231 may predict correlation parameters for each combination of online interactions with user activities, the correlation parameters including the probability of correlation indicating a probability that the online interaction influenced the user activity of a respective combination. In some embodiments, where the probability of match exceeds a threshold, such as, e.g., 0.5, 0.7, 0.8, 0.9, 0.95, 0.97, 0.99 or other probability, the respective interaction is grouped with the respective activity. Based on the probabilities for each combination and the threshold, the record resolution engine 230 may output activity correlation data 204 that represents online interactions that are correlated with each activity to form grouped activity data objects and online behavior records.

In some embodiments, the illustrative embodiments of computer-based systems, the illustrative embodiments of computer-based devices, and the illustrative embodiments of computer-based components of the present disclosure may be configured to utilize one or more exemplary AI and machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture or model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values, functions or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function or the activation function to make the node more or less likely to be activated.

In some embodiments, the grouped activity data objects and online behavior records may be saved as online interaction groupings with associated user activities, and the online behavior records sharing a common activity data object may be merged into a common activity correlation record in a user profile in a profile database, such as, e.g., the profile database 105 described above. In some embodiments, the online interaction groupings may be utilized for security and behavior analysis, among other applications.

Figure 3:
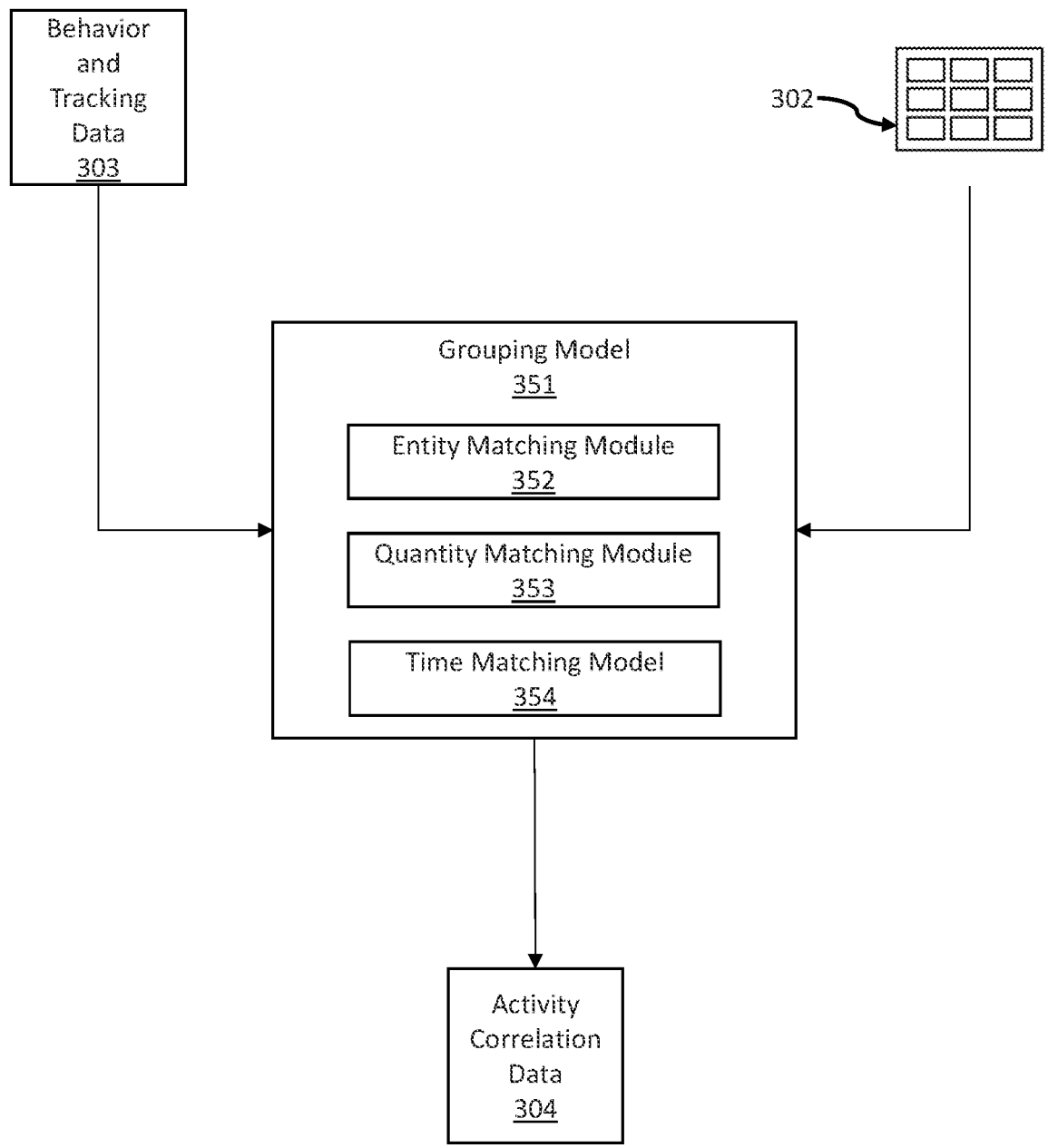

FIG. 3 is a block diagram of another illustrative computer-based system for social media data grouping in accordance with one or more embodiments of the present disclosure.

In some embodiments, a grouping model 351 may receive behavior and tracking data 303, such as, e.g., the online behavior data 201 and tracking data produced by the content detector 220 described above, and user activity data objects 302, such as the activity data objects 202 described above, as input parameters to determine activity correlation data 304. In some embodiments, the activity data objects each include an activity data record having an activity type indicator that indicates a type of each activity, a related entity indicator that indicates an entity associated with the activity, and a date indicator that indicates a date on which the activity was performed. For example, the activity may include a financial transaction such as a payment for the purchase of a product or service. As a result, the activity type indicator may indicate the type of transaction (e.g., payment, transfer, deposit, or other transaction), the related entity indicator may indicate a merchant or other entity with whom the user transacted, and the date indicator may indicate the date of the transaction. Similarly, in some embodiments, may include, e.g., a merchant indicator indicating the respective merchant of the content, a product indicator indicating a product associated with the content, an interaction date indicator indicating a date of each interaction, a platform indicator indicating a platform on which the interaction occurred, among other data.

In some embodiments, the grouping model 351 may group online interactions and user activities based on, e.g., an associated entity, an associated quantity or product, and an associated date for each online interaction and each user activity data object. Accordingly, in some embodiments, the grouping model 351 may analyze each combination of an online interaction from the behavior and tracking data 303 and an activity data object from the activity data objects 302 using an entity matching module 352, a quantity matching module 353 and a time matching model 354 to determine a probability of a match between the online interaction and the activity data object.

In some embodiments, the entity matching module 352 compares the merchant indicator of the behavior and tracking data 303 with the related entity indicator of the activity data object 302. For example, in some embodiments, the merchant indicator and the related entity indicator may each include a merchant category code (MCC). However, in some embodiments, one or both of the merchant indicator and the related entity indicator may not have the MCC of the associated entity. As a result, the entity matching module 352 may also include an index of MCCs for each known entity, e.g., merchant. Accordingly, the entity matching module 352 may extract or determine based on the index the MCC of the entity for each of the merchant indicator and the related entity indicator for the respective interaction-activity combination, and determine whether the respective MCCs match. In some embodiments, where the MCCs do not match, the combination may be discarded as not being correlated.

In some embodiments, where the entity matching module 352 determines that the entity of the merchant indicator of the behavior and tracking data 303 matches the entity of the related entity indicator of the activity data object from the activity data objects 302, a quantity matching module 353 may compare the activity type indicator of the activity data object with the product indicator of the interaction of the behavior and tracking data 303. For example, in some embodiments, the activity type indicator may include, e.g., a transaction type and transaction amount, such as, e.g., a payment for a quantity of money. Similarly, the product indicator may include a product name or product type and an associated cost, including, e.g., a retail price, a sale price, a used price, a refurbished price, or other price and combinations thereof. In some embodiments, the quantity matching module 353 may determine the associated cost of the product indicator by, e.g., extracting pricing information from the tracking data. The quantity matching module 353 may compare the pricing determined from the product indicator and the transaction amount associated with the activity type indicator to determine whether there is match. In some embodiments, a match is determined where the price and the amount are equivalent. However, sometimes a user may not qualify for a sale price, or may miss a sale, or may pay more in tax and shipping, among other variations in pricing. Thus, in some embodiments, the match may be determined where the price and the transaction amount are within a threshold quantity difference, such as, e.g., an average price for shipping, an average price for tax, a tax based on a user's location, among other price variations and combinations thereof. In some embodiments, the user may have purchases multiples of the product, and thus may have a transaction amount for the associated activity type indicator that is a multiple of price. Thus, in some embodiments, the quantity matching module 353 may also determine a match where the transaction amount is a multiple of the price, either exactly, or with a threshold quantity difference as described above.

Similar to the entity matching module 352, where the quantity matching module 353 fails to determine a match for a combination, the combination may be discarded as not being correlated. However, where a quantity match is determined, the time matching model 354 may determine whether a similarity between the date indicator of the activity of the combination and the interaction date indicator of the online interaction.

In some embodiments, the time matching model 354 may grouping probability between the activity and the interaction based on a similarity of the interaction date indicator and the activity date indicator using, e.g., a classification model, such as those described above. The time matching model 354 may receive each combination of activity data object and interaction, using the respective date indicator and interaction date indicator as input parameters. In some embodiments, the time matching model 354 may analyze the date indicator and interaction date indicator to generate a grouping probability that represents a probability that the respective activity was influence by the respective online interaction. For example, the time matching model 354 may predict correlation parameters for each combination of online interactions with user activities, the correlation parameters including the probability of correlation indicating a probability that the online interaction influenced the user activity of a respective combination. In some embodiments, where the probability of match exceeds a threshold, such as, e.g., 0.5, 0.7, 0.8, 0.9, 0.95, 0.97, 0.99 or other probability, the respective interaction is grouped with the respective activity. Based on the probabilities for each combination and the threshold, the time matching model 354 may output activity correlation data 304 that represents online interactions that are correlated with each activity to form grouped activity data objects and online behavior records.

In some embodiments, the grouped activity data objects and online behavior records may be saved as online interaction groupings with associated user activities, and the online behavior records sharing a common activity data object may be merged into a common activity correlation record in a user profile in a profile database, such as, e.g., the profile database 105 described above. In some embodiments, the online interaction groupings may be utilized for security and behavior analysis, among other applications.

Figure 4:
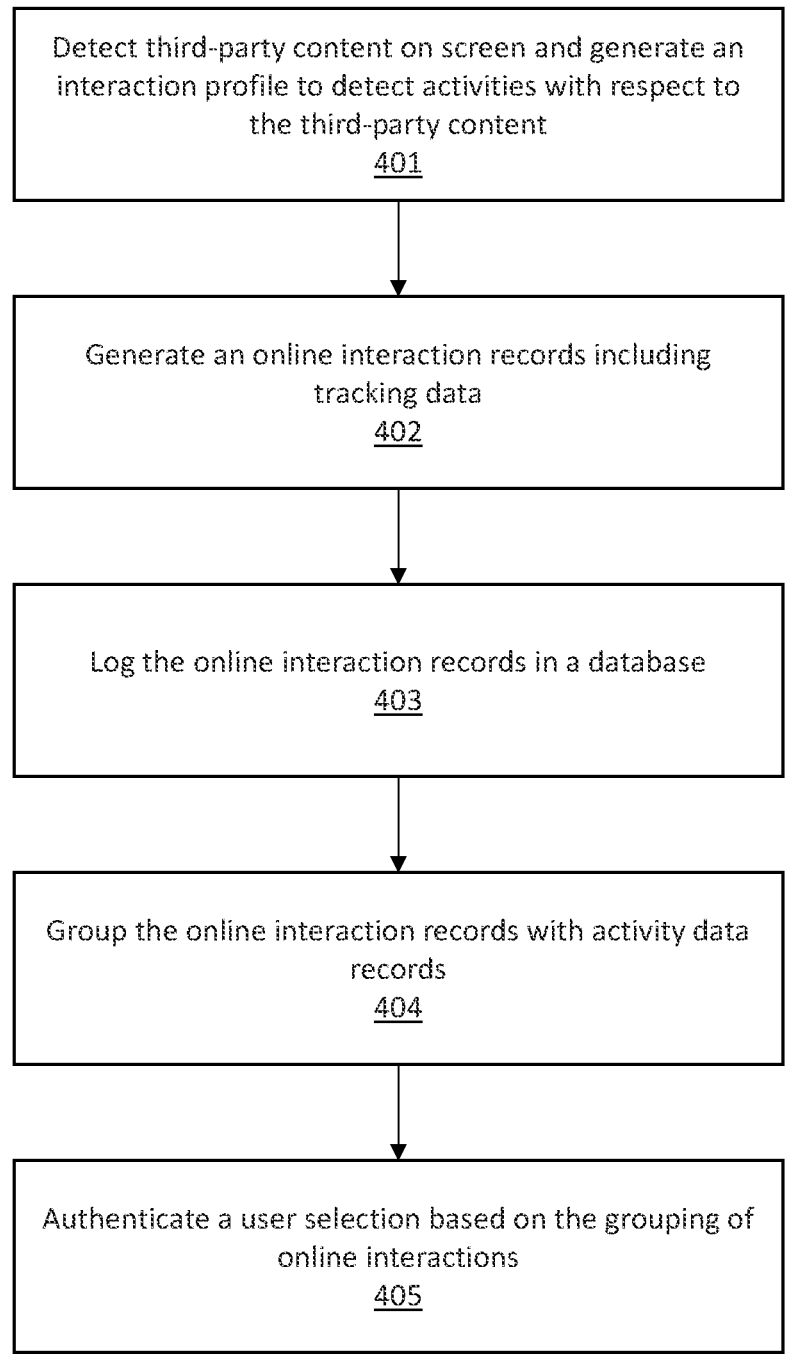

FIG. 4 illustrates a flowchart of another illustrative embodiment of methodology for social media data grouping in accordance with one or more embodiments of the present disclosure.

In some embodiments, a system, including a processing system, for social media data grouping may detect third-party content on a screen, e.g., of a user computing device, at block 401. In some embodiments, based on the detected third-party content, an interaction profile of the user is formed and a data link between the interaction profile and activity data records associated with the user is generated. In some embodiments, the activity data records identify entity-related activities performed by the user, such as, e.g., transactions including purchases of products or services. In some embodiments, the activity data records include an activity type indicator that indicates a type of each entity-related activity, a related entity indicator that indicates entities associated with each entity-related activity, and a date indicator that indicates a date associated with each entity-related activity.

In some embodiments, the system for social media data grouping may generate online interaction data objects, including tracking data at block 402. In some embodiments, each respective online interaction data object of the online interaction data objects includes tracking data indicative of associated online interactions with content associated with a third-party merchant. In some embodiments, the tracking data associated with each online interaction includes, a third-party merchant indicator indicating the third-party merchant, a product indicator indicating a product associated with the content, and an interaction date indicator indicating a date of each online interaction.

In some embodiments, the system for social media data grouping may log and store the online interaction data objects in a database, at block 403. In some embodiments, the online interaction data objects are stored in associated interaction profiles of the user, and stored in, e.g., a memory or storage device including a profile database.

In some embodiments, the system for social media data grouping may group the online interaction data objects with activity data records, at block 404. In some embodiments, the online interaction data objects are grouped with the activity data records by utilizing an activity model to predict correlation parameters representing a respective grouping of online interactions that are correlated with a respective one or more activities of the activity data record using the at least one data link. In some embodiments, the prediction of the correlation parameter is based, at least in part, on the tracking data of each online interaction data object associated with the user and each record of account activities in the at least one activity data record associated with the user.

In some embodiments, the system for social media data grouping may authenticate a user selection based on the grouping of online interactions, at block 405. In some embodiments, the system for social media data grouping may have received an authentication request in response to a user selection at the user computing device. The user selection may cause the system for social media data grouping to authenticate the user selection based on the groupings of online interactions.

In some embodiments, the authentication authenticates a fraud claim made by the user selection to generate the authentication based on an account activity in the activity data record associated with the user selection and a correlated grouping of online interactions of the at least one online interaction data object.

In some embodiments, the authentication authenticates an account activity of the at least one activity data record to generate the authentication based on each respective grouping of online interactions.

In some embodiments, the authentication authenticates an account access request using a multi-factor authentication selection based on an account activity of the at least one activity data record correlated with a particular grouping of online interactions of the grouping of online interactions of the at least one online interaction data object.

Figure 5:
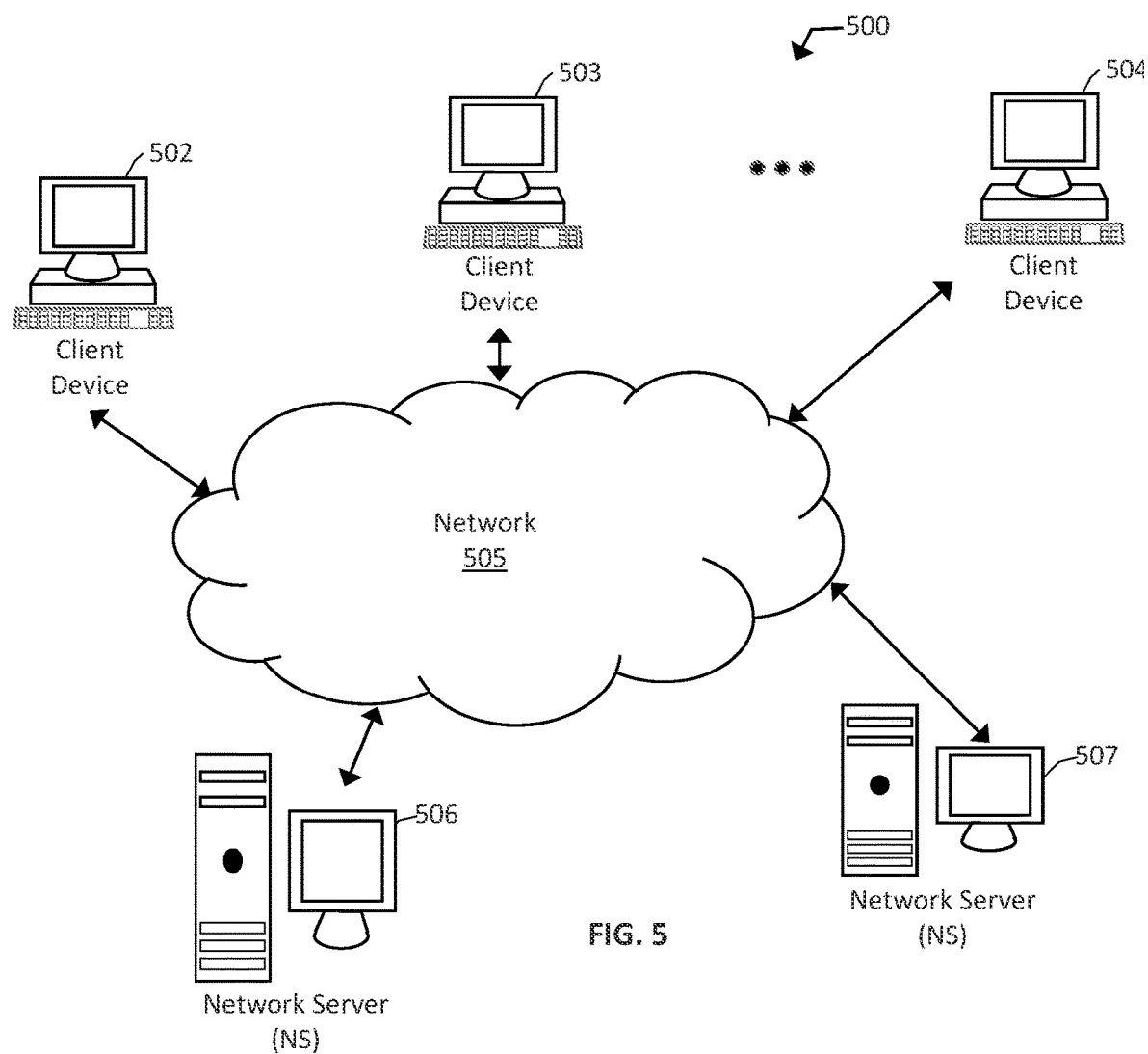

FIG. 5 depicts a block diagram of an exemplary computer-based system 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative embodiments of computing devices and the illustrative embodiments of computing components of the exemplary computer-based system 500 may be configured to manage a large number of members or concurrent transactions, as detailed herein. In some embodiments, the exemplary computer-based system 500 may be based on a scalable computer and network architecture that incorporates varies strategies for assessing the data, caching, searching, and database connection pooling. An example of the scalable architecture is an architecture that is capable of operating multiple servers.

In some embodiments, referring to FIG. 5, members 502-504 (e.g., clients) of the exemplary computer-based system 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), or any other device that is equipped to communicate over a wired or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and video, and games.

In some embodiments, the exemplary network 505 may provide network access, data transport or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for or provide cloud and network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial or banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
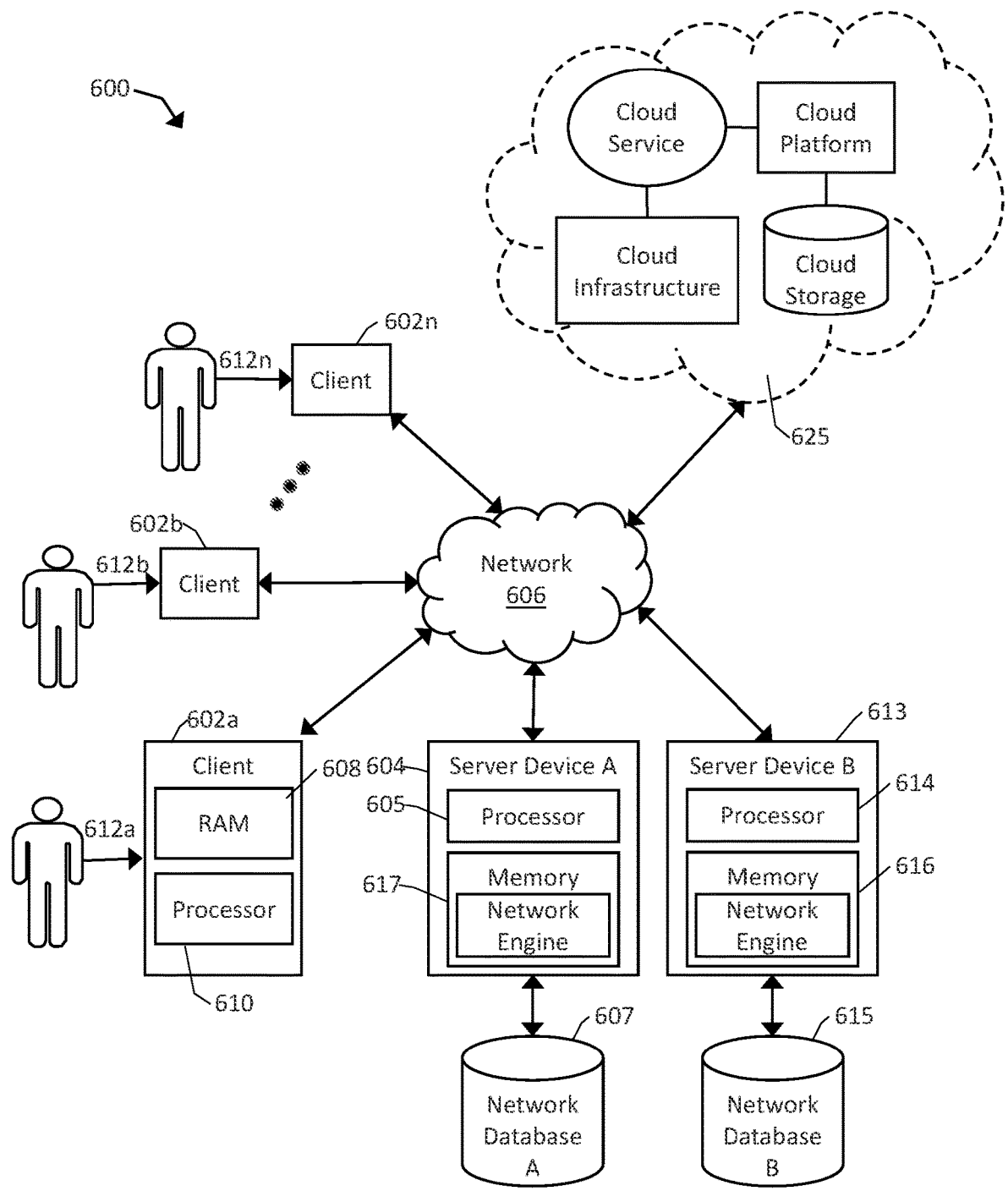

FIG. 6 depicts a block diagram of another exemplary computer-based system 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602*a*, 602*b* thru 602*n* shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602*a* through 602*n* may also comprise a number of external or internal devices such as a mouse, a CD-ROM, DVD, a physical or virtual keyboard, a display, a speaker, or other input or output devices. In some embodiments, examples of member computing devices 602*a* through 602*n* (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602*a* through 602*n* may be specifically programmed with one or more application programs in accordance with one or more principles and methodologies detailed herein. In some embodiments, member computing devices 602*a* through 602*n* may operate on any operating system capable of supporting a browser or browser-enabled application, such as Microsoft™, Windows™, or Linux. In some embodiments, member computing devices 602*a* through 602*n* shown may include, for example, personal computers executing a browser application program such as Microsoft Corporation's Internet Explorer™, Apple Computer, Inc.'s Safari™, Mozilla Firefox, or Opera. In some embodiments, through the member computing client devices 602*a* through 602*n*, users, 612*a* through 602*n*, may communicate over the exemplary network 606 with each other or with other systems and devices coupled to the network 606. As shown in FIG. 6, exemplary server devices 604 and 613 may be also coupled to the network 606. In some embodiments, one or more member computing devices 602*a* through 602*n* may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and retrieval of data in the respective database. In some embodiments, the exemplary DBMS-managed database may be specifically programmed to provide the ability to query, backup and replicate, enforce rules, provide security, compute, perform change and access logging, and automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and objects. In some embodiments, the exemplary DBMS-managed database may be specifically programmed to include metadata about the data that is stored.

Figure 7:
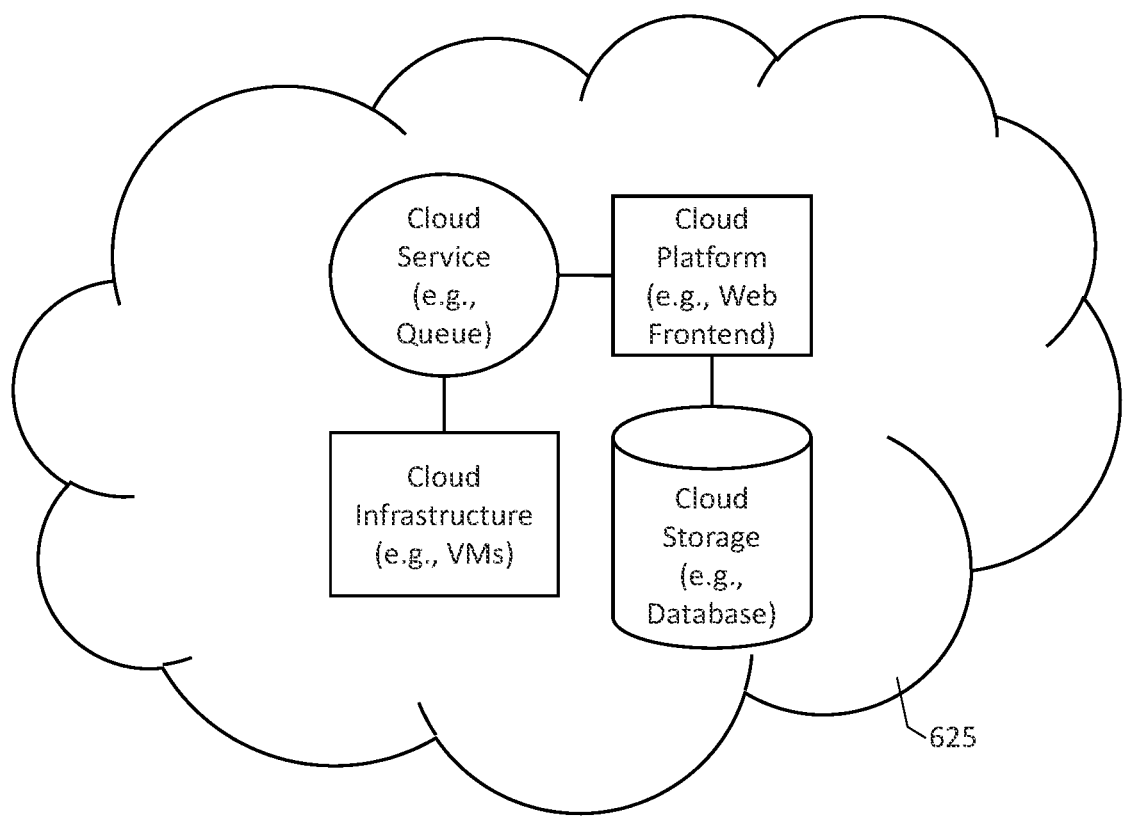
Figure 8:
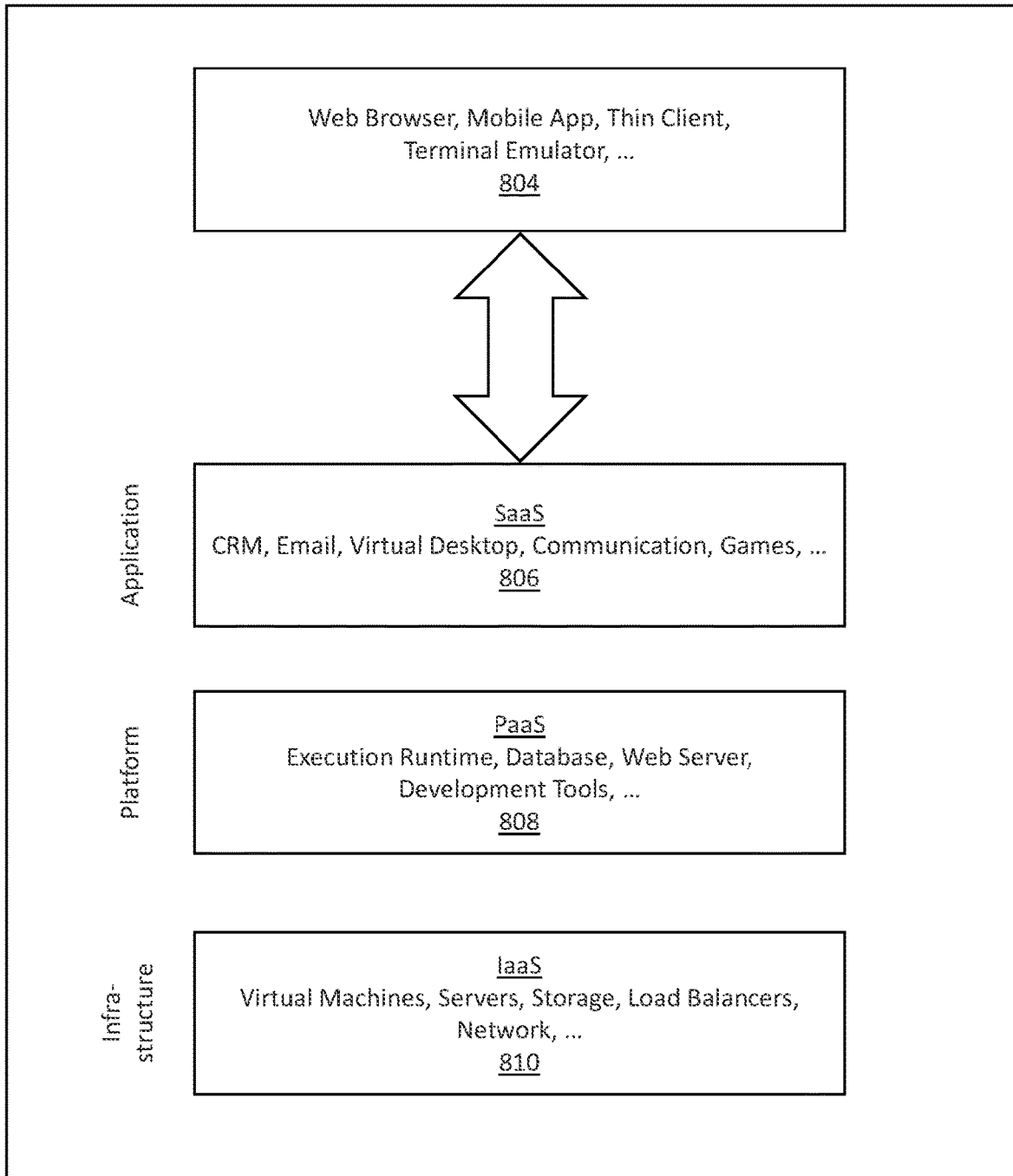

In some embodiments, the illustrative embodiments of computer-based systems of the present disclosure may be specifically configured to operate in a cloud computing architecture such as, but not limiting to: infrastructure a service (IaaS), platform as a service (PaaS), and software as a service (SaaS). FIGS. 7 and 8 illustrate schematics of exemplary implementations of the cloud computing architecture(s) in which the illustrative embodiments of computer-based systems of the present disclosure may be specifically configured to operate.

At least some aspects of the present disclosure will now be described with reference to the following numbered clauses.

1. A method comprising:
   receiving, by at least one processor, an authentication request in response to a user selection at a user computing device associated with a user;
   generating, by the at least one processor, at least one data link between:
   i) a stored interaction profile of the user and
   ii) at least one activity data record that identifies at least one entity-related activity performed by the user;
   wherein the stored interaction profile is stored in at least one profile database;
   wherein the at least one activity data record comprises:
   i) an activity type indicator that indicates a type of each respective entity-related activity of the at least one entity-related activity,
   ii) a related entity indicator that indicates at least one entity associated with each respective entity-related activity of the at least one entity-related activity, and
   iii) a date indicator that indicates a date associated with each respective entity-related activity of the at least one entity-related activity;
   receiving, by the at least one processor, at least one online interaction data object associated with the user;
   wherein each respective online interaction data object of the at least one online interaction data object comprises tracking data indicative of a respective at least one online interaction with content associated with a respective third-party merchant;

wherein the tracking data associated with each respective at least one online interaction comprises:
i) a third-party merchant indicator indicating the respective third-party merchant,
ii) a product indicator indicating a product associated with the content, and
iii) an interaction date indicator indicating a date of each online interaction;

storing, by the at least one processor, the at least one online interaction data object in the stored interaction profile associated with the user;

utilizing, by the at least one processor, an activity model to predict at least one correlation parameter representing a respective grouping of online interactions of the at least one online interaction data object that are correlated with a respective one or more activities of the activity data record using the at least one data link;

wherein the prediction of the correlation parameter is based at least in part on the tracking data of each respective online interaction data object of the at least one online interaction data object associated with the user and each record of account activities in the at least one activity data record associated with the user;

updating, by the at least one processor, the stored interaction profile associated with the user based on each respective grouping of the respective online interactions of the at least one online interaction data object and the respective one or more activities of the activity data record using the at least one data link; and causing to display, by the at least one processor, an authentication of the user selection in response to the authentication request based on the respective grouping of online interactions.

2. The method of clause 1, further comprising authenticating, by the at least one processor, a fraud clause made by the user selection to generate the authentication based on an account activity of the at least one activity data record associated with the user selection and a correlated grouping of online interactions of the at least one online interaction data object.

3. The method of clause 1, further comprising authenticating, by the at least one processor, an account activity of the at least one activity data record to generate the authentication based on each respective grouping of online interactions.

4. The method of clause 1, further comprising authenticating, by the at least one processor, the user selection comprising an account access request using a multi-factor authentication selection based on an account activity of the at least one activity data record correlated with a particular grouping of online interactions of the grouping of online interactions of the at least one online interaction data object.

5. The method of clause 1, further comprising:
receiving, by the at least one processor, the content associated with each respective at least one online interaction; and
generating, by the at least one processor, the tracking data associated with each respective at least one online interaction based on a recognition of the content obtained from an image recognition model.

6. The method of clause 1, further comprising:
receiving, by the at least one processor, the content associated with each respective at least one online interaction; and extracting, by the at least one processor, the tracking data associated with each respective at least one online interaction from tags associated with the content.

7. The method of clause 1, wherein one or more online interactions of the at least one online interaction comprises a purchase associated with the content of each respective at least one online interaction; and
wherein the content of each respective at least one online interaction comprises an online checkout page associated with a product of the third-party merchant.

8. The method of clause 1, wherein the content of each respective at least one online interaction comprises an advertisement.

9. The method of clause 1, wherein the content of each respective at least one online interaction comprises user generated content having images of at least one product associated with the third-party merchant.

10. The method of clause 1, further comprising utilizing, by the at least one processor, the account activity model to predict the correlation parameter based at least in part on each respective interaction date indicator indicating a date within a predetermined period of each respective date indicator of each respective account activity of the account activities; and
wherein the predetermined period is based at least in part on a sale period defined in the content associated with each respective at least one online interaction.

11. A method comprising:
receiving, by at least one processor, an online interaction by a user with content associated with a third-party merchant;
wherein the online interaction comprises tracking data;
wherein the tracking data comprises:
i) a third-party merchant indicator indicating the third-party merchant associated,
ii) a product indicator indicating a product associated with the content, and
iii) an interaction date indicator indicating a date of each online interaction;

storing, by the at least one processor, the online interaction in an online interaction data object associated with the user;

utilizing, by the at least one processor, an account activity model to predict a correlation parameter representing a grouping of the online interaction with one or more entity-related activities of at least one activity data record associated with the user based at least in part on the tracking data and each entity-related activity in the at least one activity data record;

wherein each entity-related activity comprises:
i) an activity type indicator that indicates a type of each respective entity-related activity of the one or more entity-related activities,
ii) a related entity indicator that indicates at least one entity associated with each respective entity-related activity of the one or more entity-related activities, and
iii) a date indicator that indicates a date associated with each respective entity-related activity of the one or more entity-related activities;

updating, by the at least one processor, the stored interaction profile associated with the user based on each respective grouping of the respective online interactions of the at least one online interaction data object and the respective one or more activities of the activity data record using the at least one data link; and causing to display, by the at least one processor, an authentication of a user selection based on the correlation parameter representing the grouping of the online interaction with the one or more entity-related activities.

12. The method of clause 11, further comprising authenticating, by the at least one processor, a fraud clause made by the user selection to generate the authentication based on the correlation parameter.

13. The method of clause 11, further comprising authenticating, by the at least one processor, the entity-related activity of the at least one activity data record to generate the authentication based on the correlation parameter.

14. The method of clause 11, further comprising authenticating, by the at least one processor, the user selection comprising an account access request using a multi-factor authentication selection based on the entity-related activity of the at least one activity data record correlated with the online interaction.

15. The method of clause 11, further comprising:
   receiving, by the at least one processor, the content associated with the online interaction; and
   generating, by the at least one processor, the tracking data associated with the online interaction based on a recognition of the content obtained from an image recognition model.

16. The method of clause 11, further comprising:
   receiving, by the at least one processor, the content associated with the online interaction; and
   extracting, by the at least one processor, the tracking data associated with the online interaction from tags associated with the content.

17. The method of clause 11, wherein the online interaction comprises a purchase associated with the content; and
   wherein the content of the online interaction comprises an online checkout page associated with a product of the third-party merchant.

18. The method of clause 11, wherein the content comprises user generated content having images of at least one product associated with the third-party merchant.

19. The method of clause 11, further comprising utilizing, by the at least one processor, the account activity model to predict the correlation parameter based at least in part on the interaction date indicator indicating a date within a predetermined period of each respective date indicator of each respective one or more entity-related activities of the at least one activity data record; and
   wherein the predetermined period is based at least in part on a sale period defined in the content associated with the online interaction.

20. A system comprising:
   at least one activity database configured to store an at least one activity data record associated with a user;
   at least one profile database configured to store a stored interaction profile associated with the user;
   at least one processor in communication with the account database and the online interaction database; and
   wherein the at least one processor is configured to:
      receive an authentication request in response to a user selection at a user computing device associated with a user;
      generate at least one data link between:
         i) a stored interaction profile of the user and
         ii) at least one activity data record that identifies at least one entity-related activity performed by the user;
         wherein the stored interaction profile is stored in the at least one profile database;
         wherein the at least one activity data record comprises:
            i) an activity type indicator that indicates a type of each respective entity-related activity of the at least one entity-related activity,
            ii) a related entity indicator that indicates at least one entity associated with each respective entity-related activity of the at least one entity-related activity, and
            iii) a date indicator that indicates a date associated with each respective entity-related activity of the at least one entity-related activity;
      receive at least one online interaction data object associated with the user;
         wherein each respective online interaction data object of the at least one online interaction data object comprises tracking data indicative of a respective at least one online interaction with content associated with a respective third-party merchant;
         wherein the tracking data associated with each respective at least one online interaction comprises:
            i) a third-party merchant indicator indicating the respective third-party merchant,
            ii) a product indicator indicating a product associated with the content, and
            iii) an interaction date indicator indicating a date of each online interaction;
      store the at least one online interaction data object in the stored interaction profile associated with the user;
      utilize an activity model to predict at least one correlation parameter representing a respective grouping of online interactions of the at least one online interaction data object that are correlated with a respective one or more activities of the data record using the at least one data link;
         wherein the prediction of the correlation parameter is based at least in part on the tracking data of each respective online interaction data object of the at least one online interaction data object associated with the user and each record of account activities in the at least one activity data record associated with the user;
      update the stored interaction profile associated with the user based on each respective grouping of the respective online interactions of the at least one online interaction data object and the respective one or more activities of the activity data record using the at least one data link; and cause to display an authentication of the user selection in response to the authentication request based on the respective grouping of online interactions.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and any desired steps may be eliminated).

The invention claimed is:

1. A method comprising:
receiving, by at least one processor via a browser extension, instructions to present at least one online interaction data object comprising a measurement of a plurality of online interactions by a user with online content;
detecting, by the at least one processor, an entity associated with the at least one online interaction data object based at least in part on the online content;
accessing, by the at least one processor, a plurality of transaction records associated with the entity;
wherein the plurality of transaction records are recorded in an account associated with the user;
wherein the account is stored in at least one account database;
wherein each transaction record of the plurality of transaction records comprises at least one transaction attribute comprising at least one of:
a transaction date indicator indicating an activity date, or
a transaction entity indicator indicating an entity associated with each transaction;
utilizing, by the at least one processor, an activity model to generate at least one correlation parameter indicating a degree of influence of the online content on the plurality of transaction records; and
causing to display, by the at least one processor, an online content recommendation on at least one computing device associated with the entity to indicate the degree of influence of the online content in response to the at least one correlation parameter exceeding a predetermined correlation threshold.

2. The method of claim 1, further comprising:
determining, by the at least one processor, a similarity between at least one tracking data attribute for each online interaction of the plurality of online interactions and the at least one transaction attribute of each transaction of the plurality of transaction records; and
utilizing, by the at least one processor, the activity model to generate the at least one correlation parameter based at least in part on the similarity.

3. The method of claim 1, further comprising authenticating, by the at least one processor, a fraud claim made by user selection to generate the authentication based on the account activity associated with the user selection and a correlated grouping of online interactions of the at least one online interaction data object.

4. The method of claim 1, further comprising authenticating, by the at least one processor, the account activity to generate the authentication based on each respective grouping of online interactions.

5. The method of claim 1, further comprising authenticating, by the at least one processor, a user selection comprising an account access request using a multi-factor authentication selection based on the account activity correlated with a particular grouping of online interactions of the grouping of online interactions of the at least one online interaction data object.

6. The method of claim 5, wherein the multi-factor authentication selection comprises a user selection of a particular online interaction from a plurality of options, the particular online interaction matching at least one online interaction in the grouping of online interactions.

7. The method of claim 1, further comprising:
receiving, by the at least one processor, the content associated with each respective at least one online interaction; and
extracting, by the at least one processor, tracking data associated with each respective at least one online interaction from tags associated with the content.

8. The method of claim 1, wherein one or more online interactions of the at least one online interaction comprises a purchase associated with the content of each respective at least one online interaction; and
wherein the content of each respective at least one online interaction comprises an online checkout page associated with a product of the third-party merchant.

9. The method of claim 1, further comprising:
receiving, by the at least one processor, location data associated with the at least one online interaction; and
determining, by the at least one processor, tracking data comprising physical activities based on the location data.

10. The method of claim 1, further comprising receiving, by the at least one processor, content tags associated with the content from a social media software development kit (SDK).

11. A system comprising:
at least one processor configured to:
receive, via a browser extension, instructions to present at least one online interaction data object comprising a measurement of a plurality of online interactions by a user with online content;
detect an entity associated with the at least one online interaction data object based at least in part on the online content;
access a plurality of transaction records associated with the entity;
wherein the plurality of transaction records are recorded in an account associated with the user;
wherein the account is stored in at least one account database;
wherein each transaction record of the plurality of transaction records comprises at least one transaction attribute comprising at least one of:
a transaction date indicator indicating an activity date, or
a transaction entity indicator indicating an entity associated with each transaction;
utilize an activity model to generate at least one correlation parameter indicating a degree of influence of the online content on the plurality of transaction records; and
cause to display an online content recommendation on at least one computing device associated with the entity to indicate the degree of influence of the online content in response to the at least one correlation parameter exceeding a predetermined correlation threshold.

12. The system of claim 11, the at least one processor further configured to:
determine a similarity between at least one tracking data attribute for each online interaction of the plurality of online interactions and the at least one transaction attribute of each transaction of the plurality of transaction records; and
utilize the activity model to generate the at least one correlation parameter based at least in part on the similarity.

13. The system of claim 11, the at least one processor further configured to authenticate a fraud claim made by user selection to generate the authentication based on the account activity associated with the user selection and a correlated grouping of online interactions of the at least one online interaction data object.

14. The system of claim 11, the at least one processor further configured to authenticate the account activity to generate the authentication based on each respective grouping of online interactions.

15. The system of claim 11, the at least one processor further configured to authenticate a user selection comprising an account access request using a multi-factor authentication selection based on the account activity correlated with a particular grouping of online interactions of the grouping of online interactions of the at least one online interaction data object.

16. The system of claim 15, wherein the multi-factor authentication selection comprises a user selection of a particular online interaction from a plurality of options, the particular online interaction matching at least one online interaction in the grouping of online interactions.

17. The system of claim 11, the at least one processor further configured to:
   receive the content associated with each respective at least one online interaction; and
   extract tracking data associated with each respective at least one online interaction from tags associated with the content.

18. The system of claim 11, wherein one or more online interactions of the at least one online interaction comprises a purchase associated with the content of each respective at least one online interaction; and
   wherein the content of each respective at least one online interaction comprises an online checkout page associated with a product of a third-party merchant.

19. The system of claim 11, the at least one processor further configured to:
   receive location data associated with the at least one online interaction; and
   determine tracking data comprising physical activities based on the location data.

20. The system of claim 11, the at least one processor further configured to receive content tags associated with the content from a social media software development kit (SDK).

* * * * *